United States Patent [19]

Kellam et al.

[11] Patent Number: 4,763,279

[45] Date of Patent: Aug. 9, 1988

[54] METHOD AND APPARATUS FOR CONVERTING DOT MATRIX DISPLAY DATA OF ONE RESOLUTION TO A FORMAT FOR DISPLAYING ON A DISPLAY DEVICE HAVING A DIFFERENT RESOLUTION

[75] Inventors: Karen K. Kellam; Ronnie C. Tong, both of Charlotte, N.C.

[73] Assignee: International Business Machines Corporation, Armonk, N.Y.

[21] Appl. No.: 813,763

[22] Filed: Dec. 26, 1985

[51] Int. Cl.⁴ .............................................. G06F 15/66
[52] U.S. Cl. .................................... 364/518; 340/731; 364/520
[58] Field of Search ............................... 364/518–521; 340/729, 731

[56] References Cited

U.S. PATENT DOCUMENTS

| | | | |
|---|---|---|---|
| 4,090,188 | 5/1978 | Suga | 340/324 AD |
| 4,278,359 | 7/1981 | Weikel | 400/303 |
| 4,283,724 | 8/1981 | Edwards | 340/731 |
| 4,459,431 | 7/1984 | Hiroichi et al. | 178/30 |
| 4,603,396 | 7/1986 | Washizuka et al. | 364/520 |
| 4,651,287 | 3/1987 | Tsao | 364/520 X |

Primary Examiner—Gary V. Harkcom
Assistant Examiner—H. R. Herndon
Attorney, Agent, or Firm—Pollock, Vande Sande & Priddy

[57] ABSTRACT

A method for converting original print data of one resolution N into print data of a higher resolution M. The small segment N1 original data is determined by comparing N to M and deriving the smallest fraction therefrom. Additional data is added to the original data by inserting M1-N1 blank data commands evenly between each of the original data. Each inserted blank is converted to a print command when the preceding and following original data are print commands.

16 Claims, 7 Drawing Sheets $B \geq N_1$

METHOD AND APPARATUS FOR CONVERTING DOT MATRIX DISPLAY DATA OF ONE RESOLUTION TO A FORMAT FOR DISPLAYING ON A DISPLAY DEVICE HAVING A DIFFERENT RESOLUTION

The present invention relates to generating graphic display data for a fixed output resolution graphics display device. Specifically, a method is described for converring print data having one resolution which may have been generated from a host computer to a resolution required for printing with a dot matrix printer which has a dedicated output resolution different than the host computer data resolution.

Matrix printers available for printing data from a host computer, such as a personal computer, have limited resolution capabilities. Dot matrix printers in widespread use today utilize a fixed resolution capability such as 60, 120 and 240 dots per inch, in order to avoid the additional expense of having multiple graphic resolutions available. Attempts have been made in the past to provide for a printer with a selectable graphic resolution. These prior art attempts propose utilizing a variable speed motor in conjunction with data modifying algorithms for changing the resulution of the printer. U.S. Pat. No. 4,278,359 describes one such technique which incorporates a variable speed motor and variable frequency oscillator to provide for a different printer resolution.

U.S. Pat. No. 4,283,724 describes a technique for changing the character size of a character to be displayed. The reference describes a variable size character generator utilized for controlling the height and width of a character before displaying. The system appears very useful in controlling specific characters of a limited character inventory. However, a graphics display, wherein each dot may be part of an image not directly related to a known print character, is not possible with this system.

Other references in the prior art describe techniques for scaling characters or recomputing a new data point based on an old data point and approximate output pitch. These systems as well appear dedicated to a limited inventory of print characters.

The full benefits of printer graphics requires that graphics of different resolutions, not limited to character display and generation, be emulated for printing on a fixed dot printer resolution. The use of the dot matrix printer, for other than character printing, is becoming more popular and useful as a means for communication. Thus, for full compatability with available host computer data sources, graphics printing is desired using a printer of one resolution and a source of data of another usually lower resolution. If the graphics data is not converted to account for the difference in resolution, the printed image will suffer from distortion.

SUMMARY OF THE INVENTION

It is therefore an object of this invention to provide for a method of converting dot matrix print data of one resolution to print data of a different resolution compatible with the resolutions of a graphic data display device.

It is a more specific object of this invention to provide a method for converting print data from a host processor to print data suitable for printing on a printer having a higher print resolution while preserving line continuity and image proportionality in the higher resolution data.

It is yet another object of the invention to convert print data from a host processor from a higher resolution to a lower resolution for printing on a dot matrix printer having a lesser print data resolution.

In accordance with the invention, a method is provided for analyzing an input data stream of a first usually lower resolution and converting that data to a higher resolution suitable for printing with a dot matrix printer or displaying on other dot matrix display devices having a dedicated resolution. The data is received in slices, a slice corresponding to a display command for each data display position of the display device. This invention may also find use as an intermediary step in converting higher resolution data to lower resolution data. As used herein in the context of the preferred embodiment, display commands indicate the presence or absence of a character to be displayed on a dot matrix printer. The presence of a character which is a dot is referred to as a print command, and the absence of a dot is a blank command.

In carrying out the conversion from a lower data resolution to a higher data resolution, the data is first analyzed by deriving the ratio of the number of data positions in the original host supplied print data stream to the data positions at the new desired resolution. This ratio comprises the lowest common fraction of the ratio of the input data resolution N and output data resolution M. This lowest common fraction $N1/M1$ identifies the smallest segment, $N1$, of original data slices which is to be converted into the smallest segment of the higher resolution data, $M1$. For every $N1$ segment of input data slices defining a print command or the absence of a print command, i.e., a blank command, $M1$ such data positions for the segment are created by the method of the present invention.

The conversion from a lower data resolution to a higher data resolution, in accordance with the present invention distributes the smaller resolution segment $N1$ over the larger segment $M1$ in a format to preserve line continuity and image proportionality. The difference (B) represented by $M1-N1$ identifies the number of additional data slices which are to be added to each segment $N1$ of the original data slices to have data of a resolution M. These additional data slices initially comprise data indicating blank commands, evenly distributed with the original data to derive a new data stream having a sufficienr number of data slices.

In one embodiment of the method for converting lower resolution graphic data to higher resolution graphic data, when Nl is greater than B, a single blank command data slice is inserted every whole number integer of the fraction $N1/(B)$ of original data slices until the required extra data positions are created with blank command data slices. Whole number integer, as used herein, refers to the integer portion of a fraction, i.e., where the fraction is 5/2, the whole number integer is 2. In the event that some of the original data remain unseparated after inserting the blank command data slices, the original data must be redistributed so that certain locations in the data stream contain more than $N1/B$ original data slice. The locations are determined by the whole number of the fraction $B/SNAF$, where SNAF (slices not accounted for) is the number of remaining data to distribute. Inclusion of more than $N1/B$ original data slice at the integer interval will evenly distribute the original data in the higher resolution data stream.

In the event that N1 is less than or equal to B, a number of blank data commands are inserted between each data of the original data stream until the full number M1 of data positions are derived. This number of blank commands is selected to be the whole number integer portion of the fraction B/N1.

After inserting the required number of blanks between the original data of the original data stream, any blank commands which remain are evenly distributed throughout the data stream. The remaining blank commands SNAF (slices not accounted for) are distributed at locations in the data stream which are determined as the whole number integer of the fraction N1/SNAF where SNAF is the number of blank command data slices to be distributed.

In both instances, where N1 is less than B and N1 is greater than or equal to B the resulting data stream is checked to see if one or more inserted blank commands are bounded by two print commands. These blank commands are changed ro a print command which eliminates any spreading resulting from the insertion of blank commands in the data stream.

Printing of the new higher resolution data stream will then provide a proportioned display of the original lower resolution data.

In accordance with the invention, the foregoing method may also be utilized to convert higher resolution data to lower resolution data. This technique will find use when the host processor delivers data at a print resolution greater than the printer resolution capacity. Alternatively, when the printer has multiple resolution capabilities, it may be advantageous to print at a lower resolution. Lower resolution printing may, in some instances, provide for a higher quality print and less document printing time.

The conversion of higher resolution graphics data to lower resolution graphics data employs the foregoing method to convert the original higher resolution graphics data to an intermediate graphics data of a greater resolution. The intermediate graphics data is then converted to the desired lower resolution graphics data by combining groups of data slices of the higher resolution data to form a single data slice. The grouping of the intermediate data is selected to include X data slices, where X is a whole number integer representing the ratio of intermediate data resolution to the data resolution of interest.

DESCRIPTION OF THE PREFERRED EMBODIMENT

Figures 1, 2, 3, 4:
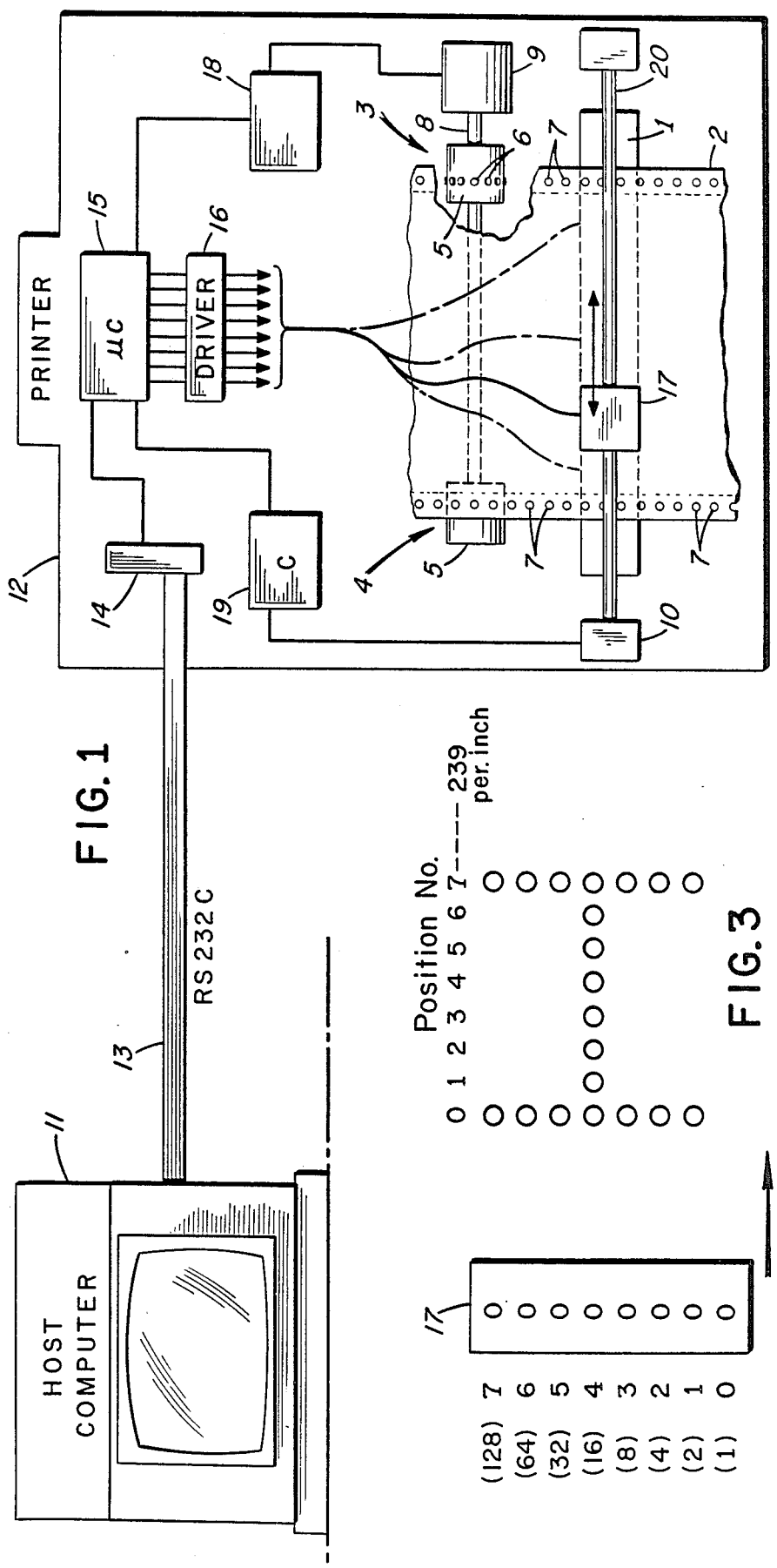
FIG. 1 is an overall block diagram showing a printer of a fixed resolution which will carry out the method in accordance with the invention of converting lower resolution data to a compatible fixed higher resolution data stream.
FIG. 2 demonsrrates the print head configuration in a dot matrix printer incorporating the method in accordance with the present invention.
FIG. 3 illustrates the technique for generating the character H from the print head of FIG. 2.
FIG. 4 illustrates the format of the print data received from the host computer 11.

Referring now to FIG. 1, there is shown in block diagram form a typical dot matrix printer 12 connected to receive dot matrix print data from a host computer 11. The host computer 11 can be any standard personal computer connected by a standard interface 13, such as RS232C to the dot matrix printer 12. The dot matrix printer 12 may be any of several types, the IBM 4201 printer for graphics printing manufactured by the IBM Corporation being generally representative of the fixed resolution printer. The dot matrix printer 12 has a limited number of resolution capabilities. The printer 12 includes an 8-wire print head 17. A print head driver circuit 16 supplies a 1 or 0 drive signal to each of 8 wires of the print head, indicating a print command, or the absence thereof, i.e., a blank command, is to be effected at a print position of the print head.

The printer includes a platen 1 over which a print medium 2, for example a continuous web of paper, is moved by means of two tractor devices 3, 4. Each tractor device includes a wheel 5 provided with pins 6 on its outer surface. The pins 6 are adapted to engage with holes 7 formed adjacent to the side edges of the medium 2. The two wheels 5 are mounted on a common shaft 8 which can be rotated as required by a motor 9 in order to move the medium 2 over the platen 1. Motor 9 receives a command from controller 18 which indexes the medium 2.

The printer includes a print head 17 which is mounted on a support extending over the platen 1 so that the medium passes between the platen 1 and the print head 17. The print head 17 can be moved along the support by means of a motor 10 by, for example, forming cooperating threads on the support 20 and the head 17 and rotating the support 20. The print head can thereby perform printing operations at any point in the surface of the medium 2 as the print head is moved across the medium and the medium is moved over the platen.

The print head 17 is driven horizontally with respect to the print medium by a carriage control 19, operated from a host microprocessor 15. The host microprocessor 15 receives print data slices from the TS232C interface 14, and indexes the print head with respect to the print medium. At each new position the print head will be positioned to print a column of dots.

Referring to FIG. 2, the general layout of an 8-wire print head 17 is shown. The print head includes eight positions which are similar to those in the IBM 4201 printer for graphics printing. Each of the eight positions being identified by binary 1 through 128. Any combination of print wires may be selected to print any combination of dots by applying an appropriate 8 bit word to the print head. Thus, depending on the format of the eight bit signals coming from the interface 16 to the print head, the print head will print up to eight dots in a column.

The print head 17 is formed with a row of printing elements supported in a body portion, as illustrated in FIG. 2 which is a view of part of the head 17. The elements of 17 are wires which can be selectively moved axially by, for example, using an electromagnet associated with each one, and which cooperate with an ink ribbon to perform printing operations on the medium. Each print element causes the printing of a character element or print dot and as the head moves a matrix of print dots in vertical columns and horizontal rows is printed.

This method of operation of a printer is well known and will not be described in detail.

FIG. 3 demonstrates a graphic figure resembling the letter H which was formed by printing in position 0 of the print head with respect to the print medium a full column of dots from the command of binary 1 1 1 1 1 1 1 0 and then at positions 1 through 6, printing the binary commands 0 0 0 1 0 0 0 0. At position seven of a 240 dots per inch resolution, the command 1 1 1 1 1 1 1 0 is generated to complete the figure. It is to be noted that with the dot matrix printer, graphics data can be printed by locaring one or more dots with any of the positions of the print head elements.

The format of the data slices supplied by the host computer 11 for printing at each position of the print head over the print medium is shown more particularly in FIG. 4. FIG. 4 includes a preamble ESC R, x, R indicating a graphics mode of variable resolution and x indicating the particular resolution in dots/inch. The second byte oi information is the I count, shown to be 1088, corresponding to 136 dots per inch of print resolution for printing a line length of 8 inches. The following 1088 bytes of data are data slices for each position of the prinr head in the 8 inch line. Following execution of all 1088 bytes, the print head will assume a beginning position again with respect to the print medium, and an additional data stream of FIG. 4 is sent by the host computer to the printer 12.

The method in accordance with the present invention provides for programming steps in microprocessor 15 which will recognize a data stream header indicating a print data resolution different from the dedicared resolution oi the printer 12. A subroutine of microprocessor 15 will process each byte of data in accordance with the following rules when the input data stream is to be converted to data having a higher resolution.

Figure 5:
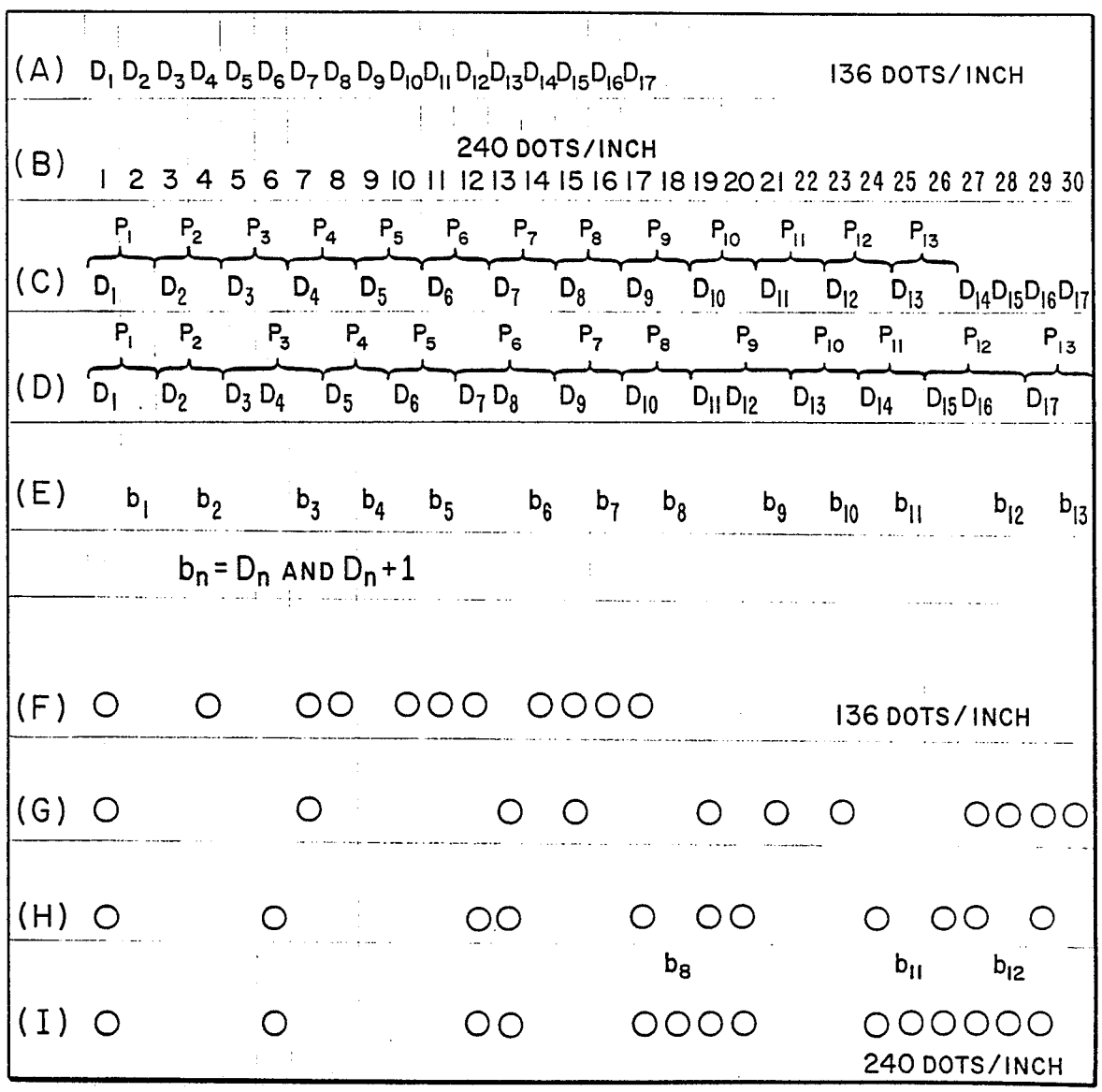
FIG. 5 illustrates the theoretical basis for changing the data of a lower resolution to the higher resolution in accordance with the present invention.

The theoretical basis for expanding data of a lesser resolution received from the host computer 11 to data of a higher resolution is demonstrated by referring to FIG. 5. In FIG. 5, line A thereof, data is shown having 136 dot per inch resolution. The prinrer dedicated print resolution is, in the present example, assumed to be 240 dots per inch. The ratio of these two resolutions N/M, reduced to its lowest fraction, N1/M1, is the fraction 17/30 where N1=17 and M1=30. This fraction identifies the smallest segment of original lower resolution data as containing 17 original data slices to be distributed over 30 data intervals of the new higher print resolution. The method in accordance with the present invention will analyze the incoming data stream for the smallest segment of data slices N1 to be emulated to a larger resolution segment, M1.

As shown in line B of FIG. 5, there are an additional 13 data positions in the new higher resolution format. These additional 13 data positions represent additional blank command data slices to be added to the original data stream. These 13 additional blank command data slices are distributed among the original 17 data positions to avoid any elongation of the print information by observing the following rules.

The 13 additional spaces, B, are spaced apart at the whole number integer represented by N1/B. This whole number integer equals 1. As such, each of the additional 13 blank commands are inserted between every original data slice position until all 13 additional spaces are utilized. Line C demonstrates the result of rhis distribution. Each of data D1 through D13 are evenly spaced into data partitions comprising an original data slice followed by an inserted blank command data slice. In other circumsrances where the integer N1/B is greater than 1, the partition will include the integer of N1/B data slices followed by an inserted blank command. A remainder SNAF of data D14, D15, D16 and D17, however, do not share the same spacing and do not include the blank command data slices separating each original data slice as the previous data portions.

As such, the remainder represents a discontinuity in the reformatted data which other processing steps will effectively remove. Since there are four remaining data, the data stream of line C is further changed, such that every third data partition, P3, P6, P9, P12, includes two of the original print data slices adjacent to each other. This rule can be stated as determining the number of remaining data slices SNAF (equal to four in the present example), and then determining every partition of data slices, represented by the whole number integer of tne fraction B/SNAF, which receives an adjacent original data slice. Thus, since 13 additional data slices were added, every third partition (the whole number integer of B/SNAF) includes the following data slice. Thus, as shown in line D, D3 and D4 occupy the same partition as do D7 and D8, D11 and D12, D15 and D16. The effect of this distribution is to more evenly distribute the 13 blank data slices B throughout the original data stream, leaving 13 partitions, every third partition including two original data slices.

Finally, an additional step is carried out for reducing any spreading which results between print commands of the higher resolution data. Each of the inserted blank data slices B1 through B13 is checked to determine whether an inserted blank data slice precedes and follows a print command. If the preceding and following original data slice separated by one or more inserted blank data slices is a print command, that blank slice or slices is converted also to a print command.

Lines F, C and H of FIG. 5 demonstrate the foregoing steps for the simplified case where the following print commands in the format of FIG. 4 are received:

| | d1 | d2 | d3 | d4 | d5 | d6 | d7 | d8 | d9 | d10 | d11 | d12 | d13 | d14 | d15 | d16 | d17 |
|---|---|---|---|---|---|---|---|---|---|---|---|---|---|---|---|---|---|
| 7 | 1 | 0 | 0 | 1 | 0 | 0 | 1 | 1 | 0 | 1 | 1 | 1 | 1 | 0 | 1 | 1 | 1 |
| 6 | 0 | 0 | 0 | 0 | 0 | 0 | 0 | 0 | 0 | 0 | 0 | 0 | 0 | 0 | 0 | 0 | 0 |
| 5 | 0 | 0 | 0 | 0 | 0 | 0 | 0 | 0 | 0 | 0 | 0 | 0 | 0 | 0 | 0 | 0 | 0 |

-continued

|    | d1 | d2 | d3 | d4 | d5 | d6 | d7 | d8 | d9 | d10 | d11 | d12 | d13 | d14 | d15 | d16 | d17 |
|----|----|----|----|----|----|----|----|----|----|-----|-----|-----|-----|-----|-----|-----|-----|
| 4  | 0  | 0  | 0  | 0  | 0  | 0  | 0  | 0  | 0  | 0   | 0   | 0   | 0   | 0   | 0   | 0   | 0   |
| 3  | 0  | 0  | 0  | 0  | 0  | 0  | 0  | 0  | 0  | 0   | 0   | 0   | 0   | 0   | 0   | 0   | 0   |
| 2  | 0  | 0  | 0  | 0  | 0  | 0  | 0  | 0  | 0  | 0   | 0   | 0   | 0   | 0   | 0   | 0   | 0   |
| 1  | 0  | 0  | 0  | 0  | 0  | 0  | 0  | 0  | 0  | 0   | 0   | 0   | 0   | 0   | 0   | 0   | 0   |
| 0  | 0  | 0  | 0  | 0  | 0  | 0  | 0  | 0  | 0  | 0   | 0   | 0   | 0   | 0   | 0   | 0   | 0   | time →

The above example assumes that only a single row of printed dots is to be printed by firing wire 7 of the print head of FIG. 2 to form the horizontal row F.

The segment of original data is distributed over the 30 interval larger resolution segment by inserting the 13 blank data slices in step C as shown in line G. In step H, corresponding to step D, every data slice of the third partition is combined with the following data slice.

Finally, those blank dara slices b8, b11 and b12 which were inserted and are bounded by print command data slices such as D10, D11, D14 and D15, and D16 and D17 are changed to print command. Thus, comparing lines F and I it can be seen that the original data is evenly distributed over the new higher resolution data segment without distortion.

The foregoing example demonstrates the theoretical basis for the present method of converting lower resolution graphics data to higher resolution graphics data when B is less than N1. Where the number of additional positions B (equal to M1−N1) of the new higher resolution data stream is greater than or equal to N1, more than one blank command data slice is added between the original data positions to form partitions with the original data to derive the new higher resolution data. These partitions comprise a group of inserted blank slices separated by a single original data slice. The number of inserted blank command data slices between each original data slice is determined by the integer P, where P=the whole number integer of the fraction B/N1.

If, after insertion of the required blank data slices there is a remainder indicating that at the end of the original data, now separated by blank data slices, a remaining number of blank data slices exist for completing the minimum segment M1, this remainder is distributed as were the remaining original data slices in the foregoing example. The number of remaining blank data slices is calculated as SNAF=B−P* (N1). These remaining blank data slices are distributed at an interval of the original data proportional to the integer SP=N1/SNAF. During every SP partition, where a partition is a group of inserted blank data slices terminated by a data slice, an additional blank data slice is inserted which will eliminate the remaining blank data slices SNAF and evenly distribute the original data.

Using the foregoing rules, a processing routine may be developed to take each of the minimum segments of lower resolution data received from the host computer 11 and convert each of these segments into data for printing on a fixed higher resolution dot matrix printer.

This discussion is the theoretical basis for making the conversion from the lower resolution data to the higher resolution format. As will become apparent in discussing the programming steps for carrying out this method, the steps of FIG. 5 can be effected without creating each of the lines B through E, but each of the required steps may be effected on each pair of received original data slices.

The previous example will be found common to many dot matrix printing schemes wherein the resolution of the printer in the horizontal direction is to be matched with the lower horizontal resolution of the received data. It should be noted, however, that the foregoing principles can be applied to match resolutions in the vertical direction. Differences in vertical resolution may be utilized to determine if additional vertical data is to be printed. Additional vertical data slices in the form of blank slices can be added to the original data to create a higher resolution data stream. The foregoing rules for redistributing the inserted data and converting the inserted data to print commands when bounded by original print commands can be effected.

This technique can be employed when any two consecutive vertical data slices are available which are separate but contiguous in a graphics display. The smallest ratio between vertical resolutions may be determined as V1/V2 and from this fraction a number of additional column data (V2−V1) to be inserted between each original column data will be found. Calculating the foregoing parameters of B, P, SNAF and SP using the column data as the data stream to be emulated will determine the new distribution of the column data. The new distribution is checked to determine if any inserted blank data slices are bounded by original print commands and thereafter converted to print commands.

The foregoing rules for converting print data of a lower resolution to a higher resolution may also be utilized as an intermediate step in forming a lower resolution data stream from an original higher print data stream. The original data stream is emulated to a higher resolution which is a multiple X of the desired lower resolution. Once formed, X adjacent new data slices are logically combined in a logic OR function to provide a single data slice at the lower data resolution. This technique of selecting a multiple X, forming the higher resolution and converting the higher resolution data to the lower resolution data of interest will be described later herein.

Summary of Foregoing Rules for Converting Lower Resolution Data to Higher Resolution Data The variables are:

| | |
|---|---|
| N: | Not supported density, to be emulated |
| M: | Supported density used for emulation |
| N1: | Least common denomination of N in (N/M) |
| M1: | Least common denomination of M in (N/M) |
| B: | Amount of blank slices need to be inserted |
| P: | No. of slices (dots) before the next slices (dots) insertion |
| SNAF: | Slices (dots) not accounted for on the first pass |
| SP: | Add one slice on each SP partition |
| DF: | The front data slice (dot) that brackets the blank(s) |
| DE: | The rear data slice (dot) that brackets the blank(s) |
| IB: | Data calculated for the inserted slice(s) (dot(s)) |

Stage 1 and 2:
B = M1 − N1
For case where N1 > B

-continued

Summary of Foregoing Rules for Converting Lower Resolution Data to Higher Resolution Data P = Integer (N1/B)
SNAF = N1 − P * (B)
SP = Integer (B/SNAF)
For case where B ≧ N1
P = Integer (B/N1)
SNAF = B − P * (N1)
SP = Integer (N1/SNAF)
Stage 3:
IB = DF and DE Incoming data is received at the known resolution N and the first of the processing steps determines the ratio N/M and the lowest fraction thereof N1/M1. Next, the number of blank spaces to be added to the lower resolution original data is determined as follows: B=M1−N1. These additional blank data slices will be distributed in accordance with the following rules depending on whether B is less than N1, or B is greater or equal to N1. In the first instance, a single blank data slice is inserted for every whole number integer represented by N1/B. In the second of these conditions, the number of blank data slices inserted between each data slice of the original data is determined as P, the whole number integer of the fraction B/N1.

Thus, in the foregoing example of converting data of a resolution of 136 dots per inch to 240 dots per inch, N1=17, M1=30, B=13 and P=1. Hence, after each of the first 13 data slices, a blank data slice is inserted.

In order to smooth out the remaining data which follows the inserted blank data slices b shown in FIG. 5, the number of remaining data slices not accounted for are determined as SNAF=N1−PxB when B is less than N1, SNAF=B−P*N1 when B is greater or equal to N1. The remaining original data or inserted data blank slices are distributed throughout the modified data stream by calculating SP, where SP equals the integer (B/SNAF) when N1>B, or SP equals the integer N1/SNAF when N1≦B. Thus, in the foregoing example, where data of a resolution of 136 dots per inch is converted to data of 240 dots per inch, SP was determined to be 3. This means that every third partition, i.e., after every third interval containing an original data slice and an inserted blank data slice, the following data slice is moved into the third partition, as shown in FIG. 5.

Thus, four blank data slices previously inserted into the data stream have been redistributed by including in every third partition an adjacent original data slice. The entire image data is evenly distributed throughout the new data stream.

The final stage of implementation will convert any of the inserted blank data slices between two consecutive print command data slices DF and DE into a print command as follows:

IB=DF and DE where DF represents the data before one or more inserted blank data slices IB, and DE represents the data following one or more inserted blank data slices.

Figure 6:
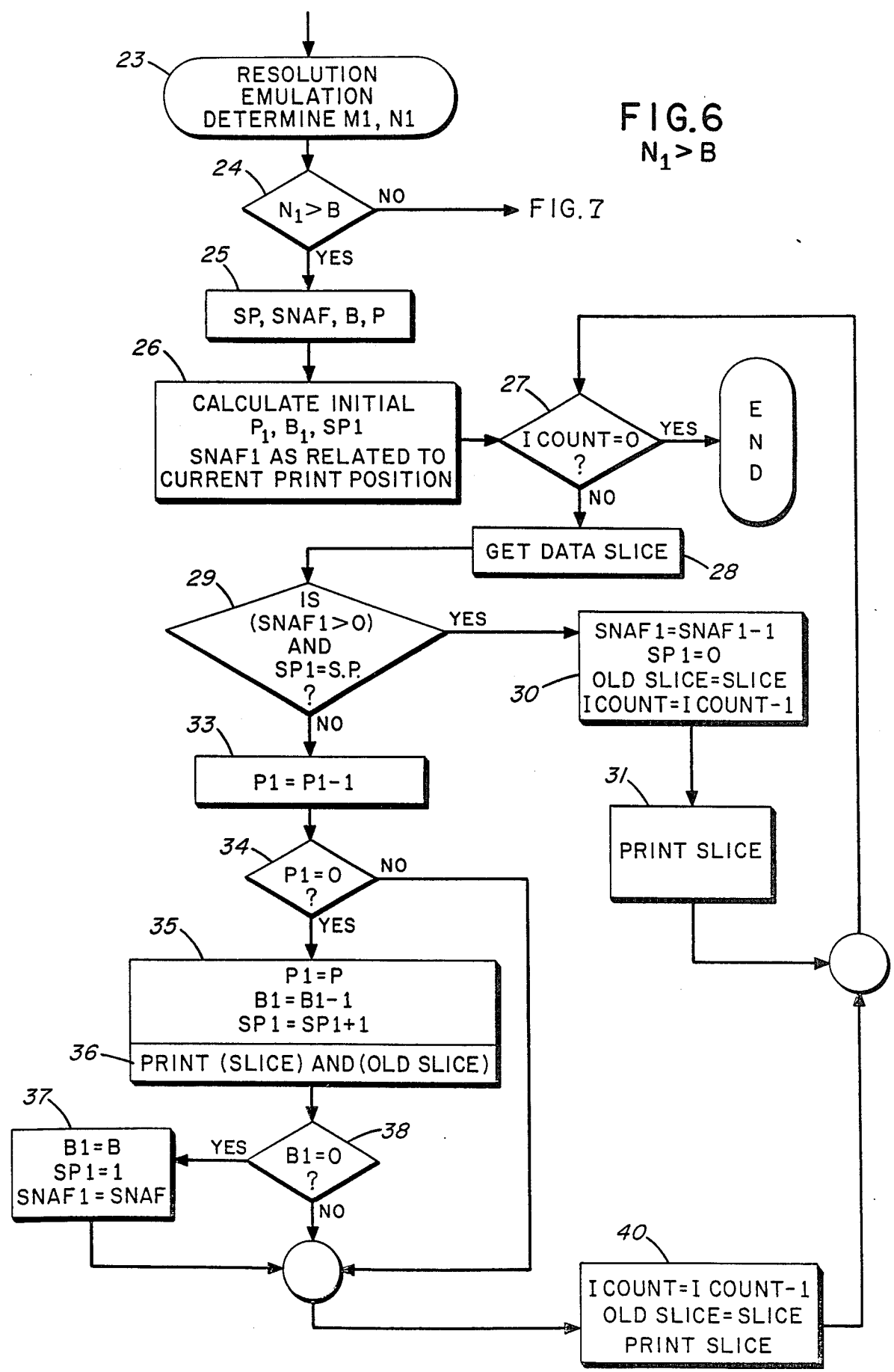
FIG. 6 is a specific computer program for a microprocessor of a dot matrix printer which will carry out the required conversion when N1>B.

Referring to FIG. 6, the program implemented in the microprocessor 15 for carrying out the foregoing method is shown. When the header on the host computer print data of FIG. 4 indicates a resolution different from the printer dedicated resolution, the resolution emulation program is entered in 23 and M1 and N1 are determined. If N1<B is determined in step 24, the remaining steps of FIG. 6, are carried out, where B≧N1, the program will proceed to FIG. 7.

Upon entry to the emulation subroutine of FIG. 6, the number of additional blank data slices B to be added to the original data; P, the number of original data to separated by an inserted blank data slice; SNAF, the remaining data after inserting the additional data to the original data stream; and SP, the location of each partition of the new data stream which receives more than one original data slice are determined as follows:

| B=M1−N1 | SNAF=N1−P*B |
|---|---|
| P=whole no. integer of $\frac{N1}{B}$ | SP=whole no. integer of B/SNAF |

Having thus determined the general parameters for processing the incoming original data, initial values are set in step 26 for the following parameters:

| P1=P+1 | SP1 = 1 |
|---|---|
| B1 = B | SNAF1 = SNAF |

P1 is the data position within a partition currently being processed, B1 the current number of blank data slices left to insert, SP1 the current partition being processed, and SNAF1 the number of data slices not accounted in a segment of N1 data slices of host data.

The program will run until all of the data received from the host computer for a given message according to FIG. 4 has been processed. Decision block 27 determines when all the data, identified by the I count number, has been so processed. At this time, the program will proceed to an end indication, permitting the microprocessor to exit from the program.

The first data slice to be processed, D1 in the foregoing example of converting data from 136 dots per inch to 240 dots per inch, is retrieved in step 28, and the programming proceeds to step 33. In step 33, the P1 value is decremented to 1. Decision block 34 indicates that D1 is currently being processed as P1=1, corresponding to the first data of the current partition being processed. A print command at 40 will print D1, the I count is decremented by 1, and OLD SLICE=NEW SLICE (D1).

Having thus printed the first data slice D1, the program continues looping back through decision blocks 27, 28 and 29 to program step 33. Decision block 29 will transfer control to a second routine when each of the partitions to receive an additional data slice is encountered. This condition is represented by SP1=SP, SP having been earlier calculated in accordance with the foregoing rules to determine at which partition an additional original data slice is to be inserted.

Continuing with the foregoing example, step 33 will decrement P1 to 0. Decision block 34 will indicate that the end of the first partition is reached, as P1=0, and a data blank slice insertion is to be effected. Programming step 35 will reset P1 to be P, decrement B1 to indicate that one of the additional blank spaces is being inserted, increment the partition number SP1, and prepare to make the required insertion in step 36.

Step 36 will perform a logical function between the previous data slice D1 (OLD SLICE) and the present data slice D2 (SLICE), thereby making an insertion depending on the result of this logical combination. As was discussed with respect to the line E of FIG. 5, if this result is a 0 a blank is inserted when step 36 is executed in step 36. After printing the result of the logical functions, step 40 will print D2.

The foregoing steps are continued until the first partition SP1 is reached which receives an additional data slice which, in the foregoing example is D4, D8, D12 and D16. Decision block 29 transfers control to programming step 30. The additional data is retrieved and printed in programming step 31. Control then returns such that decision block 29 will continue processing of the data until the second and subsequent partitions are encountered which receive an additional data slice.

When the entire segment represented by N1 data slices of the host data have been processed, decision block 38 will indicate this as B1 has been decremented to 0 indicating that the entire additional amount of data B has been inserted. Programming step 37 will reinitialize B1, SP1 and SNAF1 such that the next segment of data from the host computer 11 can be processed.

Thus, these programming steps of FIG. 6 will receive the incoming data of a lesser resolution and convert the same to the higher resolution data in accordance with the foregoing rules. FIG. 6 illustrates the condition where B is less than N1, implementing the foregoing rules for determining where to insert a blank space, how to distribute the remainder of the data spaces after inserting B blank spaces, and converting any inserted blanks to a print command when the previous and following of the original data is a print command.

Figure 7:
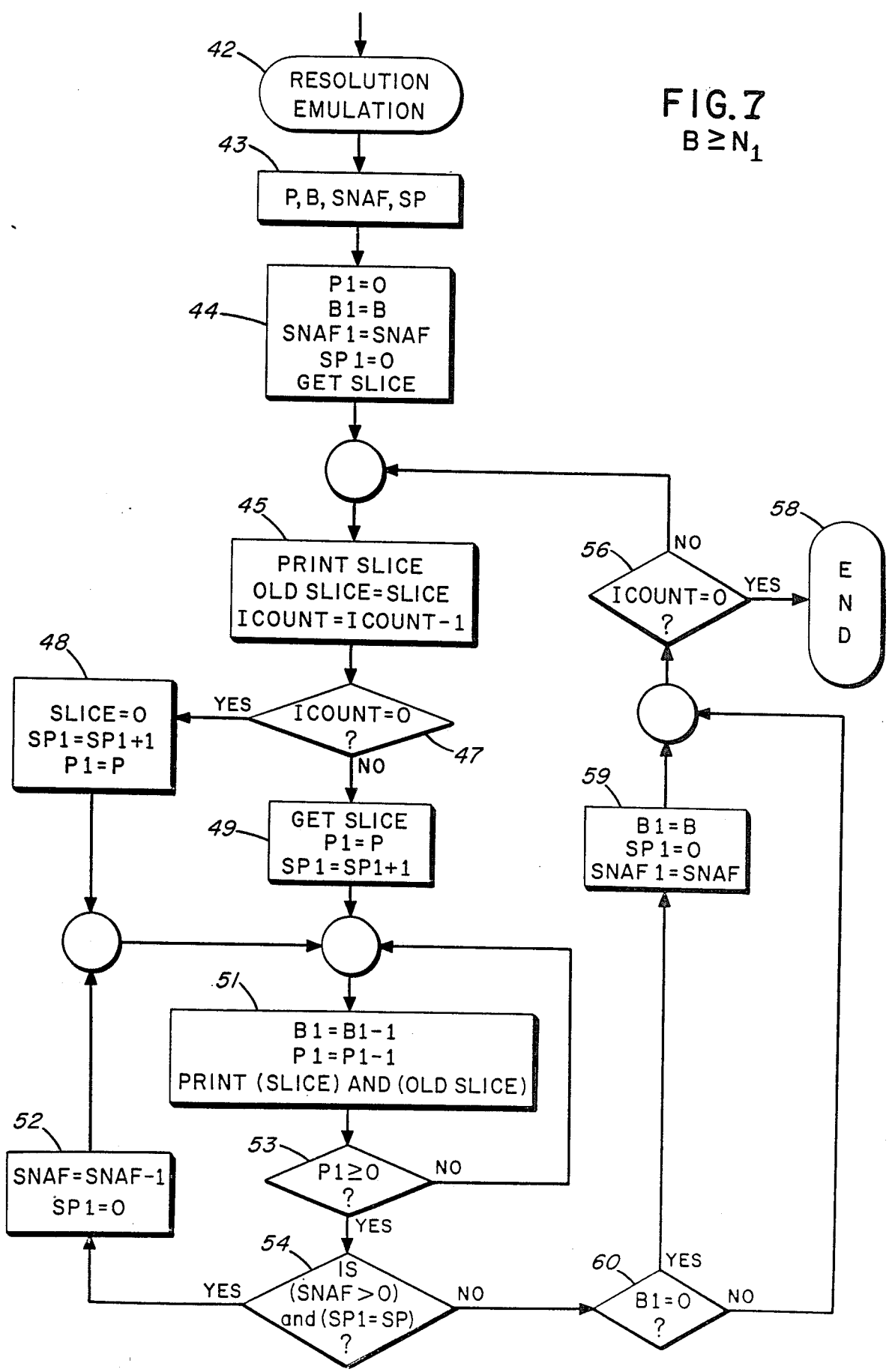
FIG. 7 is a specific computer program for a microprocessor of a dot matrix printer which will carry out the required conversion when N1≦B.

When the header of FIG. 4 is deciphered and N1 is determined to be less than or equal to B, the microprocessor will execute the subroutine of FIG. 7 for this condition. This subroutine is entered at 42, and the general parameters P, B, SNAF and SP are calculated from N1 and M1 as previously determined in step 43. P represents the number of blanks inserted between received data slices, B the total number of blank data to be inserted, SNAF the number of blank slices left to be distributed, and SP the partition number receiving one of the SNAF blanks. These parameters are determined as:

| | |
|---|---|
| $B = M1 - N1$ | $SNAF = B - P*N1$ |
| $P = $ whole no. integer of $\frac{B}{N1}$ | $SP = $ whole no. integer of $N1/SNAF$ |

Initial conditions for each of P1, B1, SNAF1 and SP1 are set in step 44. The first dot matrix print data slice is retrieved from the microprocessor 15 memory and conversion of the input original data begins.

The first of the data slices D1 will be printed in step 45 and the I count decremented by 1. Additionally, the old slice value is set to D1.

If the complete data stream of FIG. 4 has not been received as determined in decision block 47, programming step 49 will fetch another data slice D2, and initialize P1 to be equal to P and SP1 equal to SP1+1. Step 51 will insert either a blank or a print command depending on whether the old slice and new slice after being combined together in a logic AND function, produce in step 51 a 1 or a 0. The result of ANDing these two entities is printed.

Decision block 53 will determine whether or not a partition has been completed by inserting the proper number of inserted blank data slices. If P1 is greater than 0, the program returns to step 51 inserting either another blank data slice or print command, depending upon the result of the logical AND of the slice and old slice function.

Step 54 will determine when a partition has been reached of SP1=SP, such that an additional blank command is inserted. At this time, such a partition results in the program executing step 52, decrementing the value of SNAF1, indicating one remaining of the remaining blank data slices SNAF has been accounted for.

Decision block 47 will indicate the end of a data stream of FIG. 4. When $B \geq N1$, data will be inserted following the complete processing of the input data stream as an additional partition of data. Step 48 will set the next data to be inserted as a zero blank data slice, the number of remaining data P1 to be inserted as P, and set SP1, the current partition number equal to the former partition number indexed by 1. Step 51 will thereafter insert the remaining data, decrementing B1 and P1. The program will loop between decision block 53 and step 51 until $P1 \leq 0$, indicating that all of the data of the remaining P data has been inserted. Decision block 60 will determine whether or not all of the inserted data has been made in the new data stream when B1 equals 0. This results in a reinitialization of B1, and SP1 and SNAF1. The I count decision block 56 will end the processing when the I count 56 indicates that no further data is contained in the data stream of FIG. 4.

Thus, with FIGS. 6 and 7, the conditions of B greater than or equal to N1 and B less than N1 and fully accounted for.

DETAILED DESCRIPTION OF METHOD FOR CONVERTING ORIGINAL PRINT DATA TO LOWER RESOLUTION PRINT DATA

The foregoing method is useful in converting higher resolution print data to lower resolution print data. Some printers such as the referenced IBM 4201 printer although having multiple print resolutions print faster at a lower resolution making printing at the lower resolution more desirable.

In order to change higher resolution print data to a lower resolution print data, data slices of the original data stream must be removed. The removal of data slices in the higher resolution data is accomplished by combining together groups of consecutive higher resolution data slices to derive the lower resolution data slices for printing. As long as the ratio X between input data resolution and output print resolution is an integer, no crucial print information is lost. The combining stage requires the logical OR function of X consecutive data slices to produce data at the desired print resolution.

Where the ratio X between input data resolution N and output data resolution S is not exactly an integer X, the input data is converted to intermediate print data of a higher resolution X * S, using the previously described method of converting lower resolution graphic data to higher resolution graphic data. The value of X is selected such that X is greater than 1, and satisfies the following relationship:

$$((X-1) * S) < N < X * S$$

The value of X which obeys this relationship is defined as $$X = (\text{integer } ((N-1)/S)) + 1$$

Having thus determined X, the input data is converted, using the foregoing method, to an intermediate higher resolution data stream of resolution X * S. X consecutive data slices of the data stream are combined in logical OR function as (d1 OR d2 ... OR dx), (dX+1 OR dx+2 OR ... dX+X) ...

The resulting data stream is at the required resolution S.

The foregoing method is illustrated by considering an example of converting input graphic data having a print resolution of 144 dots/inch to data having a print resolution of 120 dots per inch. The value of X for creating the higher intermediate resolution data is determined as:

$$S=120, N=144, X=\text{integer}(143/120)+1=2$$

The intermediate resolution data is therefore created at a print resolution of $2 \times 120 = 240$ dots per inch.

Figure 8:
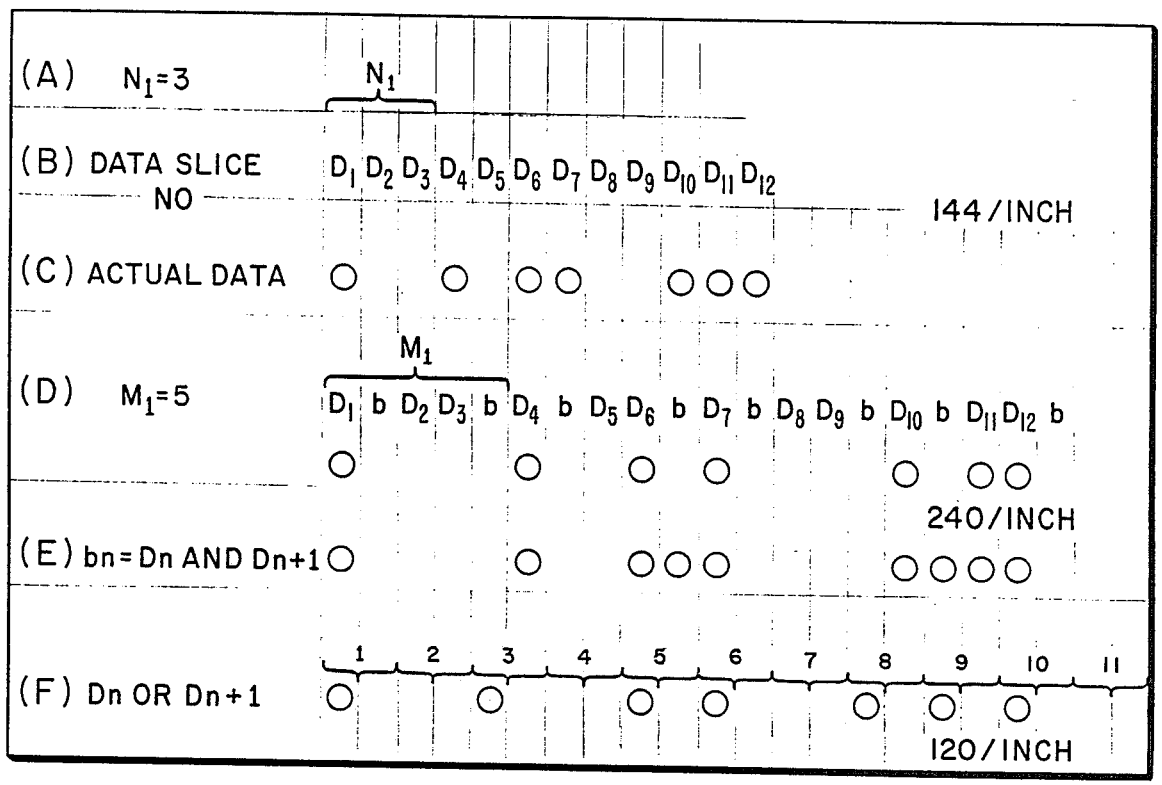
FIG. 8 illustrates the process for converting higher resolution data to lower resolution data.

Referring to FIG. 8, the result of converting the input data of a resolution N to the higher, intermediate data resolution of X*S is shown using the input data

| $D_1$ | $D_2$ | $D_3$ | $D_4$ | $D_5$ | $D_6$ | $D_7$ | $D_8$ | $D_9$ | $D_{10}$ | $D_{11}$ | $D_{12}$ |
|---|---|---|---|---|---|---|---|---|---|---|---|
| 1 | 0 | 0 | 1 | 0 | 1 | 1 | 0 | 0 | 1 | 1 | 1 | where $\frac{N}{M} = \frac{144}{240}$; $N1=3$, $M1=5$ $B = M1 - N1 = 2$; $\quad$ SNAF $= N1 - P*B$
$N1 > B \quad\quad\quad\quad\quad = 3 - [\text{integer } 2] = 1$
$\quad\quad\quad\quad\quad\quad\quad$ SP $= \text{integer}[B/\text{SNAF}] = 2$ The smallest segment of original data N1 and the smallest segment M1 of the intermediate data resolution of 240 dots/inch are shown in lines A and D. The input data slice number and actual data are shown in lines B and C. Since B=2 P=whole number integer $[N1/B]=[3/2]=1$

SNAF=1, SP=2

Therefore, after each original data D in each segment N1, a blank is inserted as shown in line D. Additionally, SNAF=1 requires that two original data be inserted in the second partition. Line E shows the result of converting each inserted blank bounded by a print command ($D_6$, $D_7$, $D_{10}$, $D_{11}$) to a print command.

The intermediate resolution data may now be converted to the desired lower resolution print data by combining in an OR function each of X consecutive data points, where X=2. The result of this combination is shown in line F.

Figure 9:
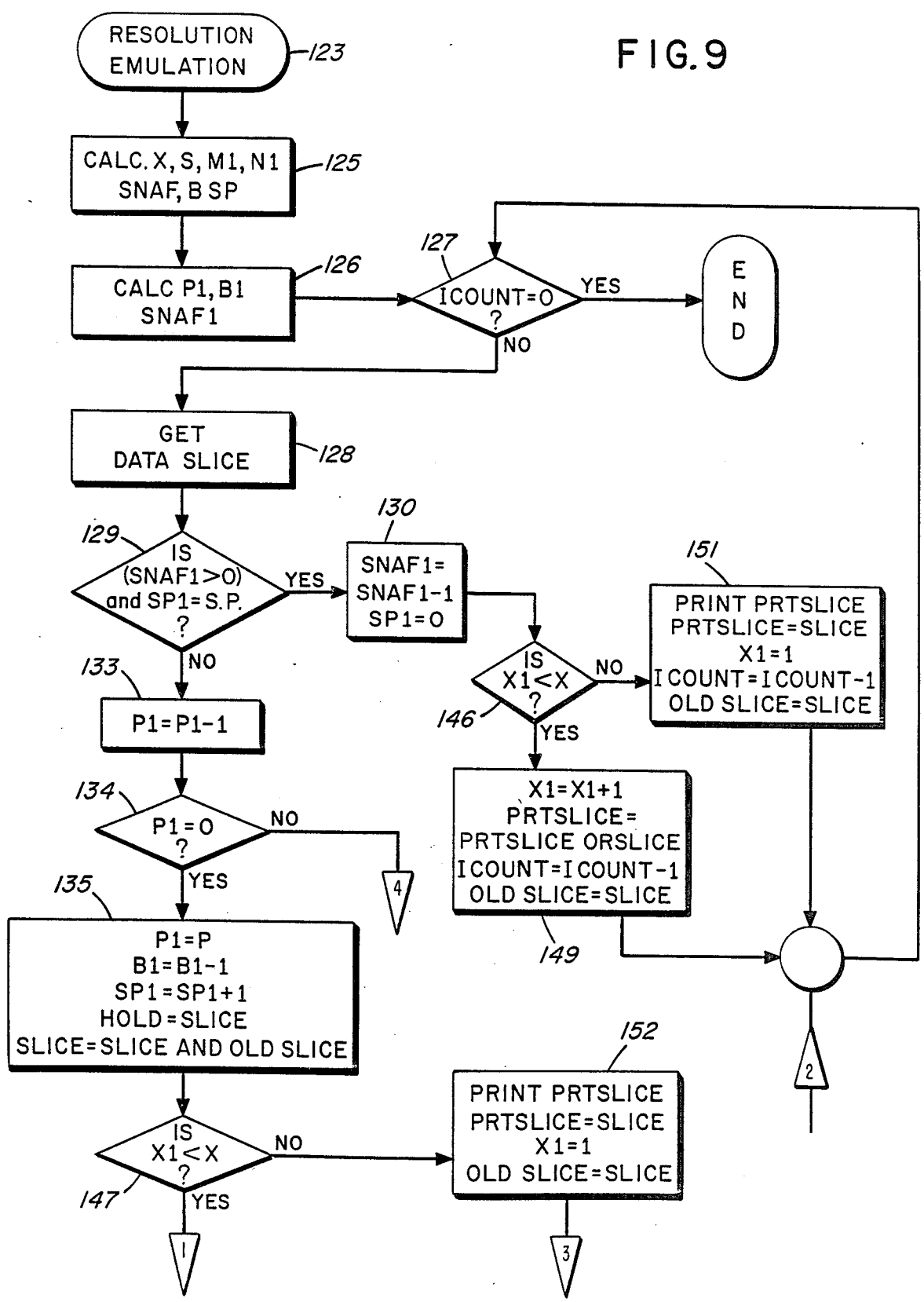
FIGS. 9 and 10 are flow charts of a specific computer program for a dot matrix printer which will carry out the required conversion when graphics data is to be converted from a higher resolution to a lower resolution.
Figure 10:
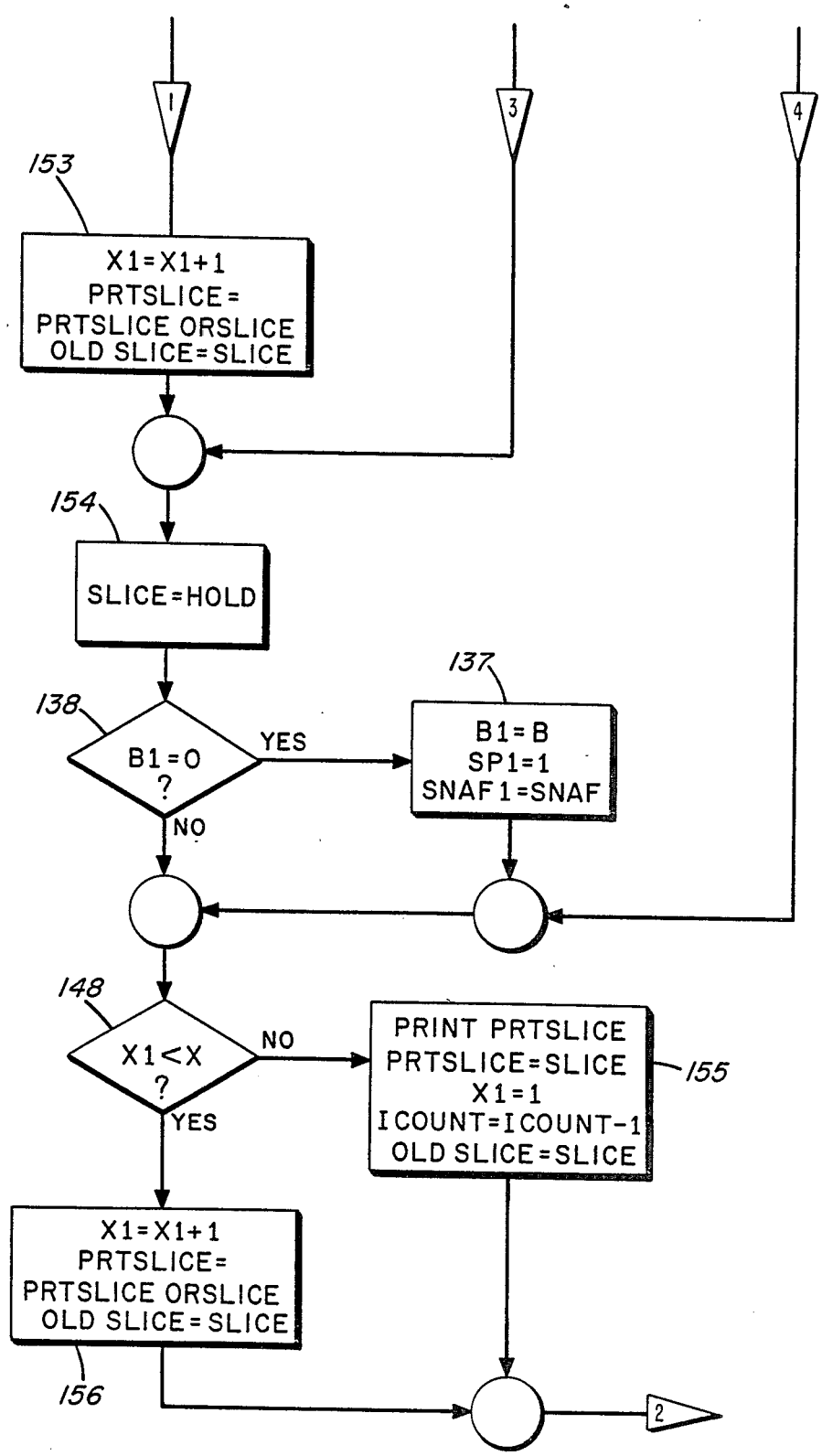

Referring now to FIGS. 9 and 10, there is shown an implementation of a program for converting the higher resolution print data to lower resolution print data. This program has been implemented, utilizing the program of FIG. 6 which converts lower resolution data to higher resolution data. As was described with respect to the example of FIG. 5, an intermediate resolution data is obtained as a step in deriving the new lower resolution data. This intermediate resolution data is at a higher resolution than the input data resolution.

The program steps of FIGS. 9 and 10 which correspond with those of FIG. 6, have been numbered as those in FIG. 6, with the prefix "1" preceding the appropriate reference numeral. Comparison of FIG. 6 and FIGS. 9 and 10 will readily identify the common steps which were modified in certain respects to be described, as well as supplemented with other steps to derive the new lower resolution data stream.

The resolution emulation 123 for deriving lower resolution data is begun by initially calculating the values for X, X*S, M1, N1, B SNAF, P and SP for the new intermediate data stream in step 125. Having thus determined the parameters of the intermediate data stream of higher resolution, and the number of consecutive data slices of this data stream which are to be combined in a logical OR function as X, the program proceeds to calculate initial values for P1, B1, SP1, SNAF1 in step 126. These calculations, as described with reference to FIG. 6, are used to generate the new intermediate higher resolution data stream having a resolution of X*S.

As the data is received, the I count is checked in step 127, and the first data slice is received in step 128. Steps 129, 133, 134 and 135 will process the data as was accomplished in FIG. 6 to create the higher resolution intermediate print data.

In the example described with respect to FIG. 5, the program of FIGS. 9 and 10 would calculate X, (X*S), M1 and N1 as shown in FIG. 5. Additionally, each of the following initial values would be set:

| | |
|---|---|
| P1 = P+1 | OLD SLICE = 0 |
| B1 = B | PRT SLICE = 0 |
| SP1 = 1 | |
| SNAF1 = SNAF | |
| X1 = 0 | |

The intermediate higher resolution (X*S) data stream will be created with steps 127 through 138. Each time a data slice of the new higher resolution data stream is created by step 135 or 130, instead of printing the newly created higher resolution data slice, the data slices are combined in a logical OR function when less than X such data slices have been formed. Decision blocks 146, 147 and 148 will determine, during the creation of the higher resolution data stream, when X of said higher resolution data slices have been created. Each time a data slice is created for the higher resolution data stream, X1 will be incremented, the previous data slice and present data slice will be ORed together in steps 153, 149 and 156 and the result designated PRT slice. Each time a new data slice of the higher resolution intermediate data is created, steps 149 and 156 will decrement the I count, set the OLD SLICE equal to the SLICE and proceed to create an additional data slice for the intermediate higher resolution data. Program control will return to creating another higher resolution data slice through path 2 until X1 has been determined to be equal to X. At this time, a sufficient number of higher resolution data bits have been created and combined in a logical OR function to permit printing of the result. Steps 151, 152 and 155 will print the result of the accumulated higher resolution data slices. The I count is decremented in steps 151 and 155, OLD SLICE is set equal to SLICE, PRT SLICE is set to SLICE and X1 is initialized to 1.

There is also shown in steps 135 and 154 additional steps of HOLD=SLICE and SLICE=HOLD. This will permit a saving of a retrieved data slice in step 128 to be ORed in step 156 with the result calculated for PRT slice in step 153.

Thus, it is seen that the previous program of FIG. 6 for generating higher resolution print data, can be modified according to FIGS. 9 and 10 to reduce the number of data slices of the newly created higher resolution intermediate print data stream. Thus, by creating a higher resolution intermediate data stream, and ORing together the created data slices in combinations of X data slices, a new lower resolution data stream for printing is generated.

Therefore, it is seen that the present invention is useful in creating both higher resolution print data and lower resolution print data from a host processor graphic data source. Those skilled in the art will readily recognize that the results achieved by the illustrative embodiment of this invention can also be achieved by using the principles disclosed by performing the calculations in different sequences than those disclosed. It is submitted that, in view of the foregoing, those skilled in the art will recognize yet other embodiments defined more particularly by the claims which follow.

Having thus described our invention, what we claim as new, and desire to secure by Letters Patent is:

1. A method of converting original serial graphics display data of one resolution N to data of a higher resolution M, said original data comprising a plurality of binary data digits where a "1" indicates a displayed command, and a "0" indicates a blank command, comprising:
    determining the smallest segment N1 of original data to be converted to data of said second higher resolution by forming a ratio of the lower and higher resolution N and M as N1/M1;
    adding additional data to said original data by inserting B blank data commands evenly between each of said original data, where B=M1−N1; and
    converting each of said inserted blank commands which lie between two consecutive print commands to a display command, whereby a segment M1 of data is produced for printing at said higher resolution.

2. The method of claim 1 wherein said additional data is inserted by inserting the same number of blank commands between each data until all of said additional data is inserted to generate a plurality of data partitions with said original data.

3. The method of claim 2 further comprising distributing any remaining data SNAF following said plurality of partitions by rearranging each partition identified by the integer of B/SNAF, where SNAF is the number of remaining data, to include the next original data.

4. A method of converting original display data of one resolution N to print data of a higher resolution M, said original display data comprising a plurality of binary data digits, a "1" indicating a display command, and a "0" indicating a blank command, comprising:
    determining the smallest segment N1 of original data to be converted to data of said second higher resolution by forming a ratio of said resolutions as N1/M1;
    determining the additional number of data B needed to be added to said original data as M1−N1;
    adding said additional data B as a blank command between each original data until said number of additional data is completely inserted, whereby each of said added data and original data define a plurality of partitions;
    distributing any remaining of either original or inserted data SNAF following said plurality of partitions throughout said partitions, in the case of remaining original data by inserting adjacent original data every partition corresponding to a multiple of the integer B/SNAF, where SNAF is the number of said original data remaining, and when said remaining data is inserted data, inserting additional data every partition corresponding to the integer N1/SNAF, where SNAF is the remaining additional data; and
    converting all inserted blank data into display data when bounded by two display data.

5. The method according to claim 4, wherein each of said additional data is inserted between each group of original data defined by the integer N1/B, when B<N1.

6. The method according to claim 4 wherein a plurality of inserted data identified by the integer B/N1 are inserted between each original data when B≧N1.

7. A method for converting original print data of one resolution N to print data of a higher resolution M, said original print data comprising a plurality of binary data slices where a "1" indicates a print command, and a "0" indicates a blank command comprising:
    determining the smallest segment N1 of original data to be converted to the smallest segment M1 of higher resolution data by forming a ratio N1/M1 of said lower N and higher M resolution;
    determining the additional number of data B to be added to said lower resolution smallest segment to arrive at said larger resolution smallest segment M1 as M1−N1;
    when B<N1, adding an additional blank command between each of a plurality of original data corresponding to the integer N1/B until B blank commands have been inserted in said original data, when B≧N1 inserting a plurality of blank commands between each original data equal to B/N1 until B such blank commands have been inserted;
    when B<N1, determining the excess number SNAF of original data slices which follow the last of said inserted blank commands, and removing one of said blank commands between said original data slices at each interval of said original data and inserted blank commands defined by the integer B/SNAF;
    when B≧N1, determining the excess number SNAF of blank commands which follow the last of said original data, and inserting an additional blank command at each interval of said original data defined by the integer N1/SNAF; and
    converting any inserted blank which is preceded and followed by a print command to a print command, whereby a minimum segment of data at said higher resolution is produced.

8. A method of converting graphic display data comprising serial data of one resolution N to data of a lower resolution S comprising:
    deriving an integer representing the ratio of said serial data of one resolution N and said lower resolution as X; and
    combining in a logical OR function groups of said serial data of resolution N, each of said groups containing X consecutive data.

9. The method according to claim 8 further comprising forming intermediate resolution data from said serial data of resolution N, said intermediate data having a resolution of X*S.

10. The method according to claim 9 where X is selected as (integer ((N−1)/S))+1.

11. A method of converting original serial graphics display data of one resolution N to data of a higher resolution M, said original data comprising a plurality of binary data digits where a "1" indicates a displayed command, and a "0" indicates a blank command, comprising:

determining the smallest segment of original data to be converted to data of said second higher resolution M by forming a ratio of the lower and higher resolution N and M as N1/M1; and adding additional data to said original data between consecutive original data until M1−N1 of such additional data have been added, said additional data forming partitions with the original data, said additional data being a "1" when the original data preceding and following said inserted data is a "1", and said additional data being a "0" when one of said preceding and following original data is a "0".

12. The method of claim 11 further comprising:

determining when a remainder of data follows said partitions; and rearranging certain of said partitions to include a subsequent original data when said remainder comprises original data, and rearranging said partitions to include an additional inserted data when said remainder includes inserted data.

13. The method of claim 12 wherein said certain partitions are identified by the integer M1−N1/SNAF when SNAF is the number of remainder of original data, and said certain partitions are identified by the integer N1/SNAF when SNAF is the number of the remainder of inserted data.

14. In a system for displaying dot matrix data, apparatus for converting serial data comprising a plurality of binary data slices comprising blank commands and a dot command of one resolution N to data of a second resolution M corresponding to the resolution of a display device comprising:

a serial data input port connected to receive individual graphic data slices along with a data header transmitted from a host processor; and a microprocessor connected to receive original serial data from said data input port and to deliver an output data stream to said display device, said microprocessor programmed to decode each received header to determine the resolution N of the data from said host device; determine a minimum ratio of input data resolution to output data resolution M as N1/M1;

determine a number of extra data positions M1−N1 in said output data stream; and inserting new data between each of said original serial graphic data until M1−N1 data are inserted, said inserted data being a blank command when one of the preceding and following original data are blank commands, and a dot command when both of said preceding and following original data is a dot command.

15. The apparatus of claim 14 wherein said microprocessor is further programmed to perform the steps of:

determining whether N1 is greater than B where B=M1−N1;

inserting each new single new data slice between original data slices at an interval corresponding to the whole number integer of N1/B; and if any remainder data slices SNAF occur following the inserted data, redistributing said original and new data slices by including more than one original data slices at intervals defined by the whole number integer B/SNAF.

16. The apparatus of claim 14 wherein said microprocessor is further programmed to perform the steps of:

determining whether N1 is less than or equal to B, where B=M1−N1;

inserting between each original data slice a number of inserted data slices corresponding to the whole number integer of the fraction B/N1; and if any remainder data slices SNAF need to be inserted to derive N1−M1 data positions, inserting an additional inserted data slice every integer of N1/SNAF.

* * * * *

UNITED STATES PATENT AND TRADEMARK OFFICE
CERTIFICATE OF CORRECTION

PATENT NO. : 4,763,279
DATED : August 9, 1988
INVENTOR(S) : Kellam et al

It is certified that error appears in the above—identified patent and that said Letters Patent is hereby corrected as shown below:

In column 1, line 11, change "converring" to --converting--;
on line 26, change "resulution" to --resolution--.

In column 2, line 50, change "sufficienr" to --sufficient--.

In column 3, line 23, change "ro" to --to--;
on line 59, change "demonsrrates" to --demonstrates--.

In column 4, line 6, delete "N1$\leq$ B" in favor of --N1 $\leq$ B--;
on line 46, after "medium" insert --2--;
on line 51, change "in" to --on--;
on line 58, change TS232C" to --RS232C--.

In column 5, line 27, change "locaring" to --locating--;
on line 35, change "oi" to --of--;
on line 39, change "prinr" to --print--;
on line 47, change "dedicared" to --dedicated--;
on line 48, change "oi" to --of--;
on line 56, change "prinrer" to --printer--.

In column 6, line 20, change "rhis" to --this--;
on line 23, change "circumsrances" to --circumstances--;
on line 40, change "tne" to --the--.

UNITED STATES PATENT AND TRADEMARK OFFICE
CERTIFICATE OF CORRECTION

PATENT NO. : 4,763,279
DATED : August 9, 1988
INVENTOR(S) : Kellam et al

It is certified that error appears in the above—identified patent and that said Letters Patent is hereby corrected as shown below:

In column 7, line 18, change "ccrresponding" to --corresponding--;
on line 20, delete "dara" in favor of --data--
on line 23, after "to" insert --a--;
on line 35, delete "resulution" and insert therefor --resolution--.

In column 9, line 7, change "$B \geq N1$" to --$B \geq N1$--;
on line 40, change "$N1 \leq B$" to --$N1 \leq B$--.

In column 10, line 1, change "$N1 < B$" to --$N1 > B$--;
on line 2, delete "$B \geq N1$" to --$B \geq N1$--.

In column 11, line 4, before "in" insert --and if the result is a logical 1, a print command is executed--.

In column 12, line 12, change "$B \geq N1$" to --$B \geq N1$--;
on line 21, change "$P1 \leq 0$" to --$P1 \leq 0$--.

In column 13, line 66, change "numberal" to --numeral--.

In column 16, line 16 (claim 6) change "$B \geq N1$" to --$B \geq N1$--
on line 35 (claim 7) change "$B \geq N1$" to --$B \geq N1$--;
on line 45 (claim 7) change "$B \geq N1$" to --$B \geq N1$--.

UNITED STATES PATENT AND TRADEMARK OFFICE
CERTIFICATE OF CORRECTION

PATENT NO. : 4,763,279

DATED : August 9, 1988

INVENTOR(S) : Kellam et al

It is certified that error appears in the above—identified patent and that said Letters Patent is hereby corrected as shown below:

Please delete the entire last page which contains columns 1 and 2 from another patent.

Signed and Sealed this

Twenty-sixth Day of December, 1989

Attest:

JEFFREY M. SAMUELS

Attesting Officer     Acting Commissioner of Patents and Trademarks